(12) United States Patent
Weigel et al.

(10) Patent No.: US 6,454,466 B1
(45) Date of Patent: Sep. 24, 2002

(54) IN SITU MOUNTABLE OPTICAL CONDUCTOR CONNECTOR AND METHOD OF ASSEMBLING THE OPTICAL CONDUCTOR CONNECTOR IN SITU

(75) Inventors: Hans-Dieter Weigel, Caputh; Uwe Günther, Berlin, both of (DE)

(73) Assignee: Infineon Technologies AG, Munich (DE)

( * ) Notice: Subject to any disclaimer, the term of this patent is extended or adjusted under 35 U.S.C. 154(b) by 0 days.

(21) Appl. No.: 09/540,940

(22) Filed: Mar. 31, 2000

(30) Foreign Application Priority Data

Mar. 31, 1999 (DE) .......................................... 199 16 397

(51) Int. Cl.⁷ ................................................ G02B 6/36
(52) U.S. Cl. ............................ 385/80; 385/77; 385/78; 385/86; 385/139
(58) Field of Search .............................. 385/80, 81, 86, 385/87, 77, 78, 139, 60, 66, 72, 76, 99, 135

(56) References Cited

U.S. PATENT DOCUMENTS 5,611,012 A * 3/1997 Kuchenbecker .............. 385/86
6,085,004 A * 7/2000 Dower et al. ................. 385/80

* cited by examiner

*Primary Examiner*—Hemang Sanghavi
(74) *Attorney, Agent, or Firm*—Laurence A. Greenberg; Werner H. Stemer; Ralph E. Locher

(57) ABSTRACT

A prefabricated plug-in assembly includes a front subframe and a plug pin arranged in it. The assembly further has a holder for an optical conductor end. Light-curable adhesive is introduced into the holder in advance and, once the optical conductor end has been introduced, is cured by supplying light. To this end, the plug-in assembly is sufficiently transparent and translucent for the light wavelength of the light used for curing.

5 Claims, 1 Drawing Sheet

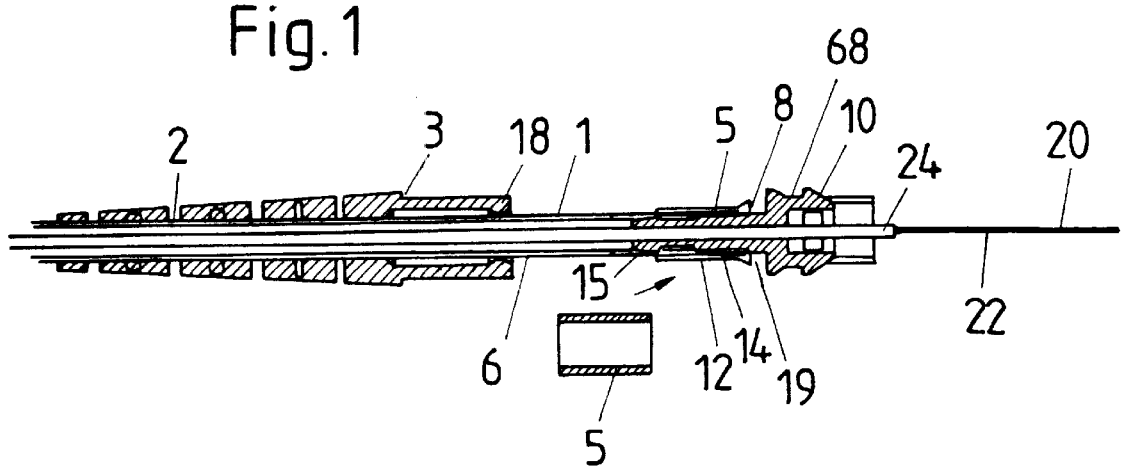
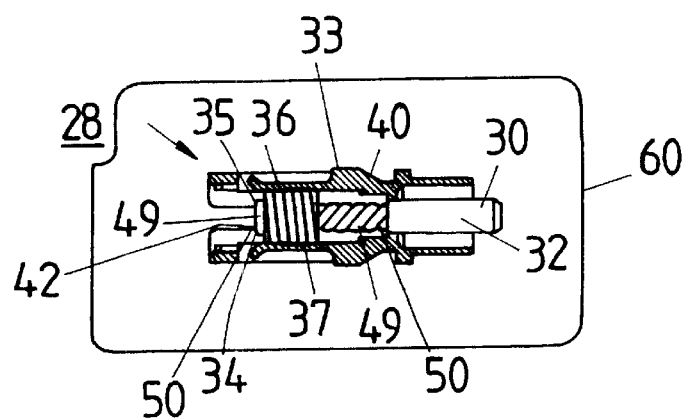
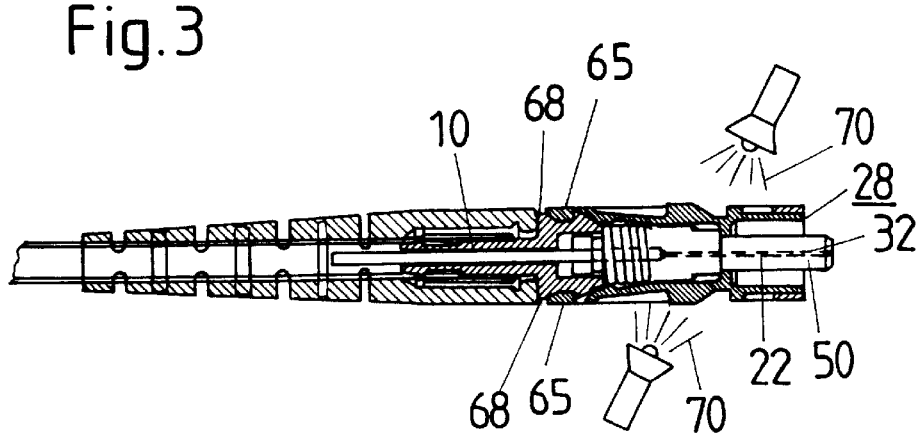

IN SITU MOUNTABLE OPTICAL CONDUCTOR CONNECTOR AND METHOD OF ASSEMBLING THE OPTICAL CONDUCTOR CONNECTOR IN SITU

BACKGROUND OF THE INVENTION

Field of the Invention

The invention lies in the field of optoelectronic devices for data transmission, in which electrical signals that have been converted by an optical transmitter into optical signals (transmission pulses), pass via optical data lines (for example an optical conductor cable) to a coupling partner. The coupling partner may be, for example, an optical receiver which converts the optical signals back into electrical signals, or maybe a further optical conductor cable, which is connected to one end of the first optical conductor cable. The optical data lines comprise one or more optical conductors, which are normally provided with optical conductor connectors at the ends, for connection to the coupling partners.

The invention relates to an optical conductor connector which can be fitted in the field, i.e., in situ. The connector has a plug-in assembly which comprises at least one front subframe and a plug pin arranged in it. It further has a holder for an optical conductor end. An amount of adhesive fixes the optical conductor end in the holder.

A connector of that type is disclosed in the commonly assigned U.S. Pat. No. 5,915,057 (German patent application DE 195 33 498). That connector contains a prefabricated plug-in assembly, which comprises a plug pin, a pin mounting, a helical spring and a front subframe that forms the front housing part. The rearward end of the plug pin in the insertion direction is held by the pin bearing, which has a through-hole with an insertion opening for threading in an optical conductor whose protective sheath has been removed at the end. A helical spring is pushed onto the rearward end of the pin bearing. The front housing part has an axial through-opening for insertion of an optical conductor end and for holding the plug-in assembly. On the inside, the housing part has retaining elements which act on the helical spring and thus secure the prefabricated plug-in assembly against sliding out backward, until the connector is completed by a housing part at the rear.

When the known connector is being mounted, the optical conductor end is threaded into a central hole in the plug pin, with the aid of the insertion opening through the through-hole in the pin bearing; in the process, adhesive is applied to the area of the insertion opening. The adhesive wets the optical conductor end during the subsequent insertion process. The adhesive then has to be cured, although the earlier U.S. Pat. No. 5,915,057 does not provide any further details relating to this.

In order to assemble the prior art plug connector in the field, it is in principle feasible for the adhesive to be applied to the very largely prefabricated connector in situ (in the field) by means of filling aids (for example flexible plastic tubes containing adhesive), and to use transportable, electrically operated heating ovens to cure the adhesive. It is also conceivable for a heat-fusion adhesive to be used, and for the plug-in assembly and the plug pin to be appropriately heated during the fitting process, and then to be fixed by subsequent cooling after insertion of the optical conductor end.

Such processes appear cumbersome and they require a relatively great expense in equipment and manpower.

SUMMARY OF THE INVENTION

The object of the invention is to provide an in situ mountable optical conductor connector which overcomes the above-noted deficiencies and disadvantages of the prior art devices and methods of this kind, and which can be fitted on site to an optical conductor cable end or to an optical conductor end using simple means and with little equipment being required.

With the above and other objects in view there is provided, in accordance with the invention, an in situ mountable optical conductor connector, comprising:
- a plug-in assembly having a front subframe, a plug pin arranged in the front subframe, and a holder for receiving and holding an optical conductor end;
- an amount of light-curable adhesive for fixing the optical conductor end in the holder, the amount of adhesive being introduced into the holder prior to the optical conductor end;
- the plug-in assembly being formed of a transparent and/or translucent material relative to light at wavelengths adapted to initiate and/or result in curing the adhesive; and
- the adhesive being cured by supplying light after the optical conductor end has been introduced into the holder.

In other words, the objects of the invention are satisfied in that the amount of adhesive is formed by a light-curable adhesive which is introduced in advance into the area of the holder, the plug-in assembly is transparent and/or translucent for light at those wavelengths which initiate and/or result in curing of the adhesive, and once the optical conductor end has been introduced into the holder, the adhesive is cured by supplying light. The term light-curable adhesive for the purposes of the present invention means an adhesive whose curing is initiated or activated (and then continues) by light, or is brought about by supplying light, i.e., by irradiating with electromagnetic radiation in the light spectrum. Both curing mechanisms may also take place in parallel.

A major aspect of the invention is the use of an adhesive which can be activated or cured by light, and is introduced into the connector, the pin mounting or the plug pin in advance—preferably at the factory during assembly of the plug-in assembly. A major further aspect of the invention is that, when being fitted in the field, the optical conductor end can easily be inserted into the still liquid or viscous adhesive in the holder, and the adhesive can then be cured using very simple equipment means—namely simply by illuminating with light. Possible adhesives are, for example, DELO-Katiobond or ICI-Light Cured Resin; adhesives whose curing process need be activated only by light and which then takes place automatically (curing initiated by light) are particularly preferred since they require only a comparatively short light illumination time and handling duration.

Further practical advantages of the invention result from the fact that no components which additionally need be handled and, possibly, need to be disposed of—such as plastic tubes as filling aids and containers for the adhesive to be used—are required for fitting. There is no need either for the mixing process required with other adhesive components (for example with two-component adhesives), or for the process of filling with adhesive to be carried out in situ. The invention furthermore considerably reduces the required curing times and, in particular, no waiting times are involved for the cooling down process, which is required for heat-fusion adhesives, before further processing.

In accordance with an added feature of the invention, the adhesive is curable by visible light, and the plug-in assembly is mounted in an opaque package until a time when the plug-in assembly is assembled.

With the above and other objects in view there is also provided, in accordance with the invention, a method of assembling an optical conductor connector in situ, which comprises:

providing a plug-in assembly having a front subframe, a plug pin arranged in the front subframe, and a holder for receiving and holding an optical conductor end;

introducing an amount of light-curable adhesive in the holder;

subsequently introducing the optical conductor end into the holder provided with the adhesive; and subsequently curing the adhesive by illuminating the adhesive with light through the plug-in assembly and thereby fixing the optical conductor end in the plug-in assembly.

In accordance with a concomitant feature of the invention, the adhesive is cured with visible light, and, in order to prevent premature curing of the adhesive, the plug-in assembly is covered by an opaque package until a time when the optical conductor connector is assembled.

It is a particularly preferred refinement of the invention for the light which initiates curing and/or results in curing to be visible light. In that case, the plug-assembly will be enclosed or stored in an opaque package until the time when it is fitted. This invention refinement allows the adhesive curing process to be initiated or brought about particularly easily by means of visible and (in particular for the eyes) safe light.

Other features which are considered as characteristic for the invention are set forth in the appended claims.

Although the invention is illustrated and described herein as embodied in an optical conductor connector which can be fitted in the field, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a longitudinal section through one end of an optical conductor cable;

FIG. 2 is a sectional view of a plug-in assembly for a connector according to the invention; and FIG. 3 is a sectional view of a connector according to the invention.

DESCRIPTION OF THE PREFERRED EMBODIMENTS

Referring now to the figures of the drawing in detail and first, particularly, to FIG. 1 thereof, there is seen a production stage during which one end 1 of an optical conductor cable 2 is being equipped with an optical conductor connector. First of all, a kink-protection sheath 3 and a crimping sleeve 5 are pushed onto the free end of the optical conductor cable 2. Once the end section of the cable sheath 6 has been removed, ends of a strain-relief material 8 (for example KEVLAR®) project from that end. These are cut to a defined length. A stop ring 10 is then inserted under the open end 12 of the cable sheath 6, until the end 12 comes into contact with an edge 14 of the stop ring 10. The strain-relief material 8 is then distributed uniformly around the rear end 15 of the stop ring 10, and the crimping sleeve 5 is pushed back over the rear end 15, with the ends of the strain-relief material 8 being located in-between, and is fixed there by crimping. The kink protection sheath 3 can then be pushed over the crimping sleeve 5, so that the bead 18 latches behind that part of the crimping sleeve 5 which has been crimped.

The end 20 of an optical conductor 22 which is routed in the cable 2 then has the buffer and protective layer 24 removed from it. The end 20 is thus prepared for the fitting of a preassembled plug-in assembly as shown in FIG. 2.

The plug-in assembly 28 shown in FIG. 2 comprises a plug pin 30 formed with a central longitudinal hole 32, which is illustrated only by way of indication, for holding the optical conductor end 20. The rearward end of the plug pin 30 is held by a pin mounting 33, onto whose rear end 34 a helical spring 35 is pushed. The helical spring is held by inner retaining elements 36, 37 of a front subframe 40, which act on the turns of the helical spring 35. The plug pin, the pin mounting, the helical spring and the front subframe thus form a preassembled plug-in assembly 28. An amount of adhesive 49 is introduced in advance into the holder 32 (longitudinal hole) and, if required, into a rear insertion region 42 of the plug pin or of the pin mounting. The adhesive 49 is a light-curable adhesive 50, which cures rapidly when exposed to light that initiates curing and/or results in curing. Before exposure to appropriate light, the adhesive retains its liquid or viscous character, so that the optical conductor end 20 (FIG. 1) can be passed through the adhesive without any problems during the fitting process, in the process wetting the optical conductor end. In order to prevent the adhesive from curing prematurely and inadvertently, at least the plug-in assembly is surrounded by an opaque package 60 until the time when it is fitted. The package 60 may preferably also contain all the other individual parts or components required for fitting the connector.

FIG. 3 shows the connector according to the invention in the assembled state, in which the plug-in assembly 28 is pushed completely onto the stop ring 10, and its latching hooks 65 latch behind corresponding recesses 68 (see FIG. 1) in the stop ring 10. In the process, the optical conductor end 20 that has been wetted with the adhesive 50 passes through the holder 32. As is illustrated schematically in FIG. 3, the arrangement is briefly illuminated (an illumination time of approximately 1 minute has been found to be sufficient) with light 70, which initiates or results in the curing of the adhesive 50. The light 70 is preferably light in the visible band, and can thus be produced particularly easily and handled safely. At least the front subframe 40, the plug pin 30 and the pin mounting 34 are manufactured from a material through which the wavelength of the light 70 can pass, so that the light 70 can penetrate as far as the adhesive 50 in the holder 32. Since there are gaps between the turns of the spring 35, the light 70 can also penetrate without any problems into the area surrounded by the spring.

The connector according to the invention provides a connector which can be assembled in the field. It can be fitted extremely quickly, and without any significant adverse effect on the overall installation, on site, when laying or repairing optical conductors or optical conductor cables. Only a few process steps and equipment that is easy to handle are required to assemble the connector.

We claim:

1. An in situ mountable optical conductor connector, comprising:
   a plug-in assembly having a front subframe, a plug pin arranged in said front subframe, and a holder for receiving and holding an optical conductor end;
   an amount of light-curable adhesive for fixing the optical conductor end in said holder, said amount of adhesive being introduced into said holder prior to the optical conductor end;
   said plug-in assembly being formed of a material selected from the group consisting of transparent materials, translucent materials, and transparent and translucent materials relative to light at wavelengths adapted to initiate and/or result in curing said adhesive, said plug-in assembly being mounted in an opaque package until assembly of said plug-in assembly; and
   said adhesive being cured by supplying light after the optical conductor end has been introduced into said holder.

2. The connector according to claim 1, wherein said adhesive is curable by visible light.

3. A method of assembling an optical conductor connector in situ, which comprises:
   providing a plug-in assembly having a front subframe, a plug pin arranged in said front subframe, and a holder for receiving and holding an optical conductor end;
   introducing an amount of light-curable adhesive in the holder;
   mounting the plug-in assembly in an opaque package until assembly of an optical conductor connector;
   subsequently introducing the optical conductor end into the holder provided with the adhesive; and
   subsequently curing the adhesive by illuminating the adhesive with light through the plug-in assembly and thereby fixing the optical conductor end in the plug-in assembly.

4. The method according to claim 3, wherein the curing step comprises illuminating the adhesive with visible light.

5. An assembly having an in situ mountable optical conductor connector and an opaque package, said in situ mountable optical conductor connector comprising:
   a plug-in assembly having a front subframe, a plug pin arranged in said front subframe, and a holder for receiving and holding an optical conductor end;
   an amount of light-curable adhesive for fixing the optical conductor end in said holder, said amount of adhesive being introduced into said holder prior to the optical conductor end;
   said plug-in assembly being formed of a material selected from the group consisting of transparent materials, translucent materials, and transparent and translucent materials relative to light at wavelengths adapted to initiate and/or result in curing said adhesive, said plug-in assembly being mounted in said opaque package until assembly of said plug-in assembly for protecting said plug-in assembly from exposure to light; and
   said adhesive being cured by supplying light after the optical conductor end has been introduced into said holder.

* * * * *